(12) United States Patent
Kurose et al.

(10) Patent No.: US 8,830,332 B2
(45) Date of Patent: Sep. 9, 2014

(54) ELECTRONIC DEVICE AND RECEPTION CONTROL METHOD

(75) Inventors: Kengo Kurose, Hamura (JP); Yuki Hayashi, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 13/613,530

(22) Filed: Sep. 13, 2012

(65) Prior Publication Data

US 2013/0229533 A1 Sep. 5, 2013

(30) Foreign Application Priority Data

Mar. 5, 2012 (JP) ................................. 2012-047953

(51) Int. Cl.
*H04N 17/04* (2006.01)
(52) U.S. Cl.
USPC .......................... 348/192; 455/135; 455/226.3
(58) Field of Classification Search
USPC ........................................................ 348/192
See application file for complete search history.

(56) References Cited

U.S. PATENT DOCUMENTS

| 8,320,502 | B2* | 11/2012 | Sakai et al. | 375/324 |
| 2007/0049191 | A1* | 3/2007 | Tomobe et al. | 455/3.01 |
| 2008/0250463 | A1* | 10/2008 | Shibusawa et al. | 725/75 |
| 2009/0141182 | A1* | 6/2009 | Miyashita et al. | 348/726 |
| 2009/0285318 | A1* | 11/2009 | Adachi | 375/260 |

FOREIGN PATENT DOCUMENTS

| JP | 11-186956 | 7/1999 |
| JP | 2004-228695 | 8/2004 |
| JP | 2007-082051 | 3/2007 |
| JP | 2008-259048 | 10/2008 |
| JP | 2010-141713 | 6/2010 |
| JP | 2011-103539 | 5/2011 |
| JP | 2011-228896 | 11/2011 |

OTHER PUBLICATIONS

Japanese Office Action for Japanese Application No. 2012-047953, mailed Nov. 27, 2012, in 6 pages.

* cited by examiner

*Primary Examiner* — Jefferey Harold
*Assistant Examiner* — Justin Sanders
(74) *Attorney, Agent, or Firm* — Knobbe, Martens, Olson & Bear LLP

(57) ABSTRACT

According to one embodiment, an electronic device receives a broadcast signal includes a high-speed transmission channel and a low-speed transmission channel. The electronic device estimates a CN when the electronic device is in an environment corresponding to a stationary state, based on a measured reception power, reception sensitivity required for receiving a broadcast service of the high-speed transmission channel and a necessary CN required for receiving the broadcast service of the high-speed transmission channel, and controls a processing of switching a demodulation target between the high-speed transmission channel and the low-speed transmission channel, based on a difference between the estimated CN and the measured CN.

10 Claims, 7 Drawing Sheets

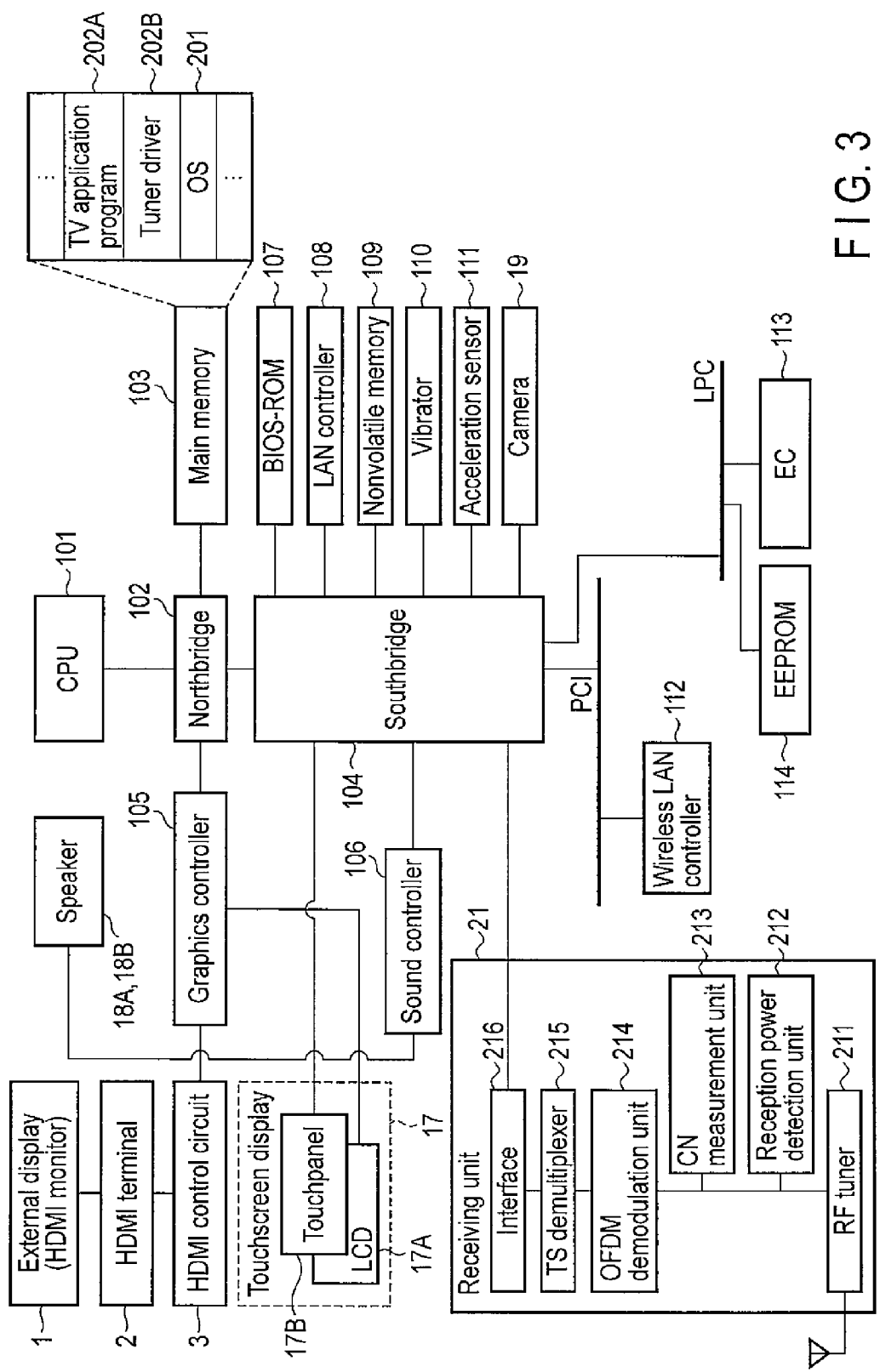
F I G. 3

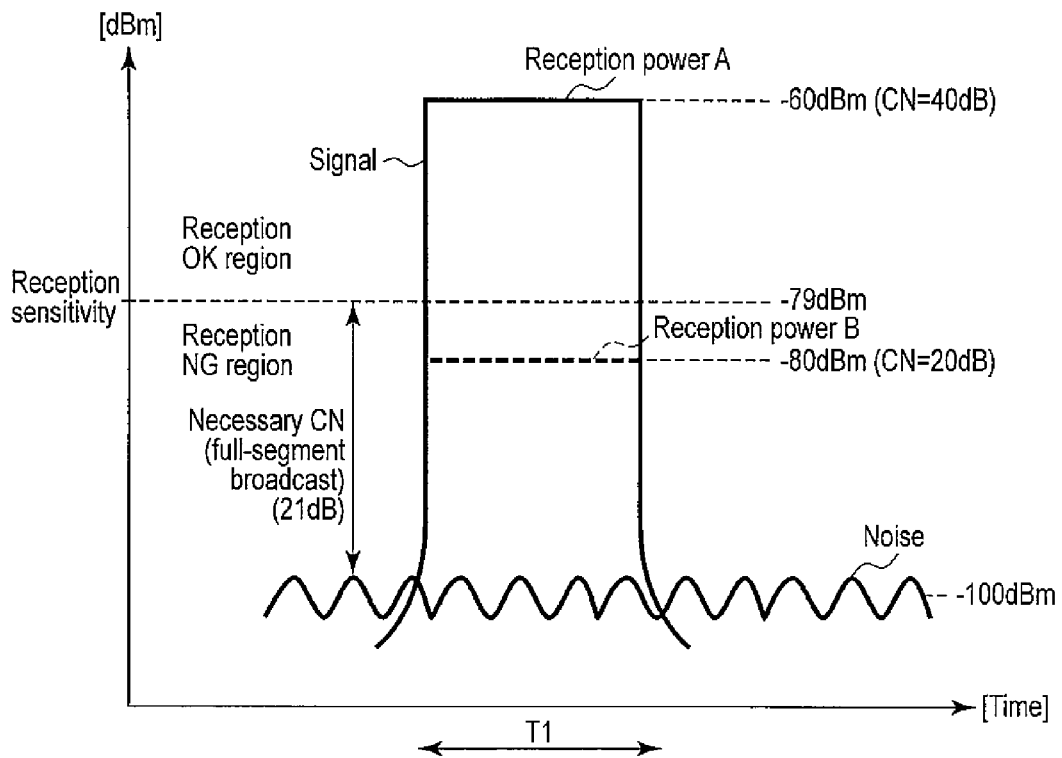
F I G. 4
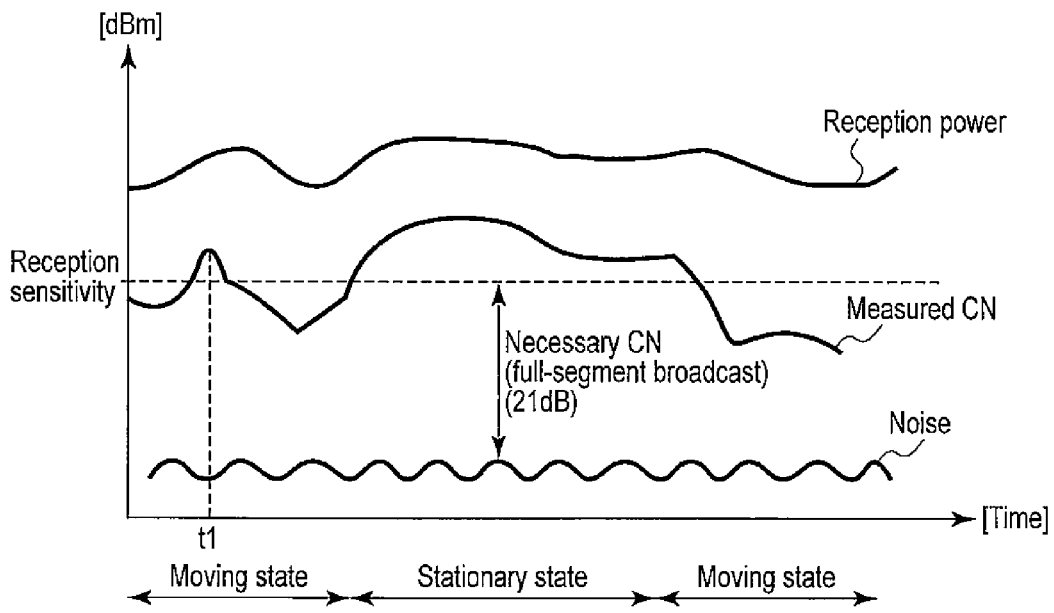
F I G. 5

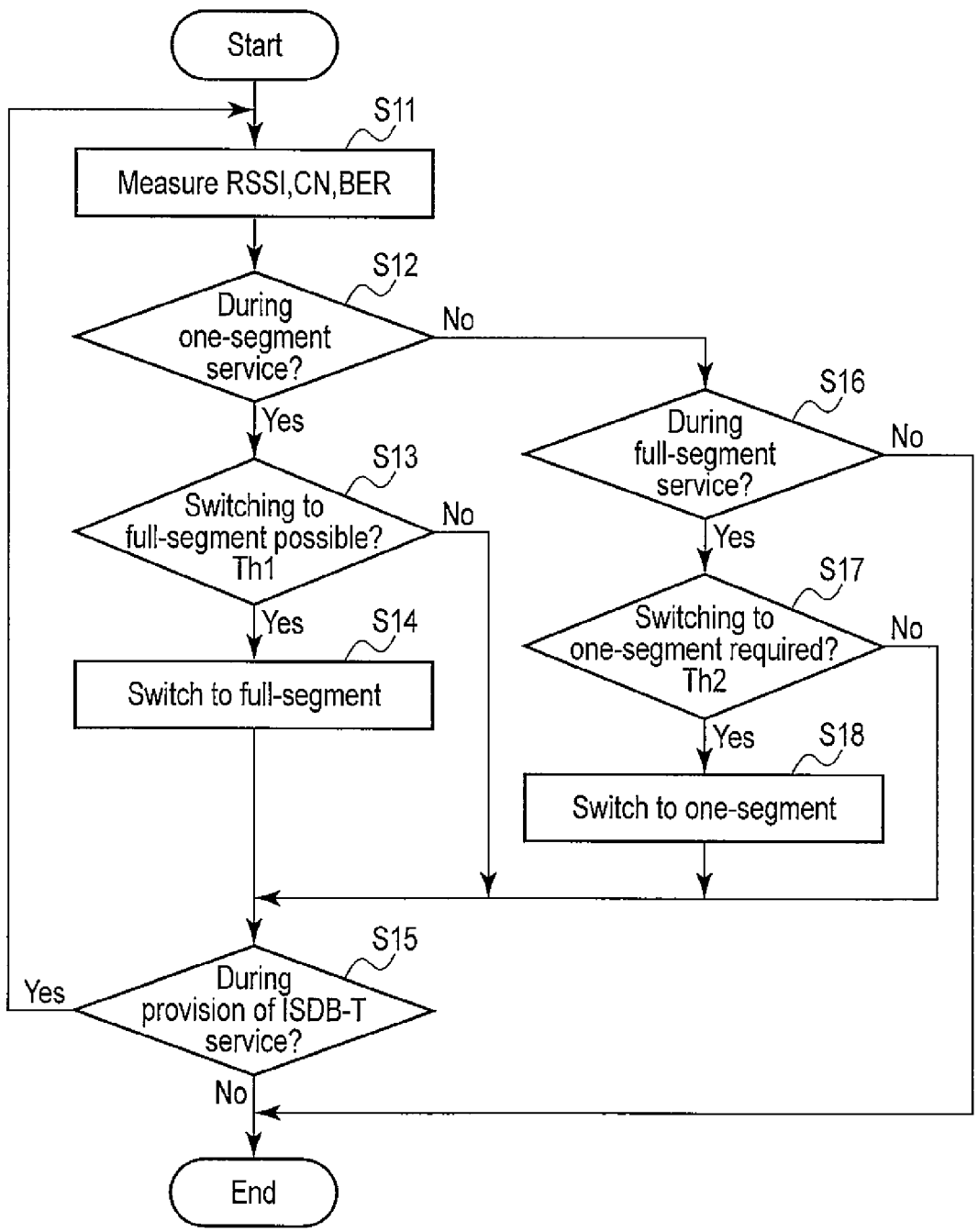
F I G. 6

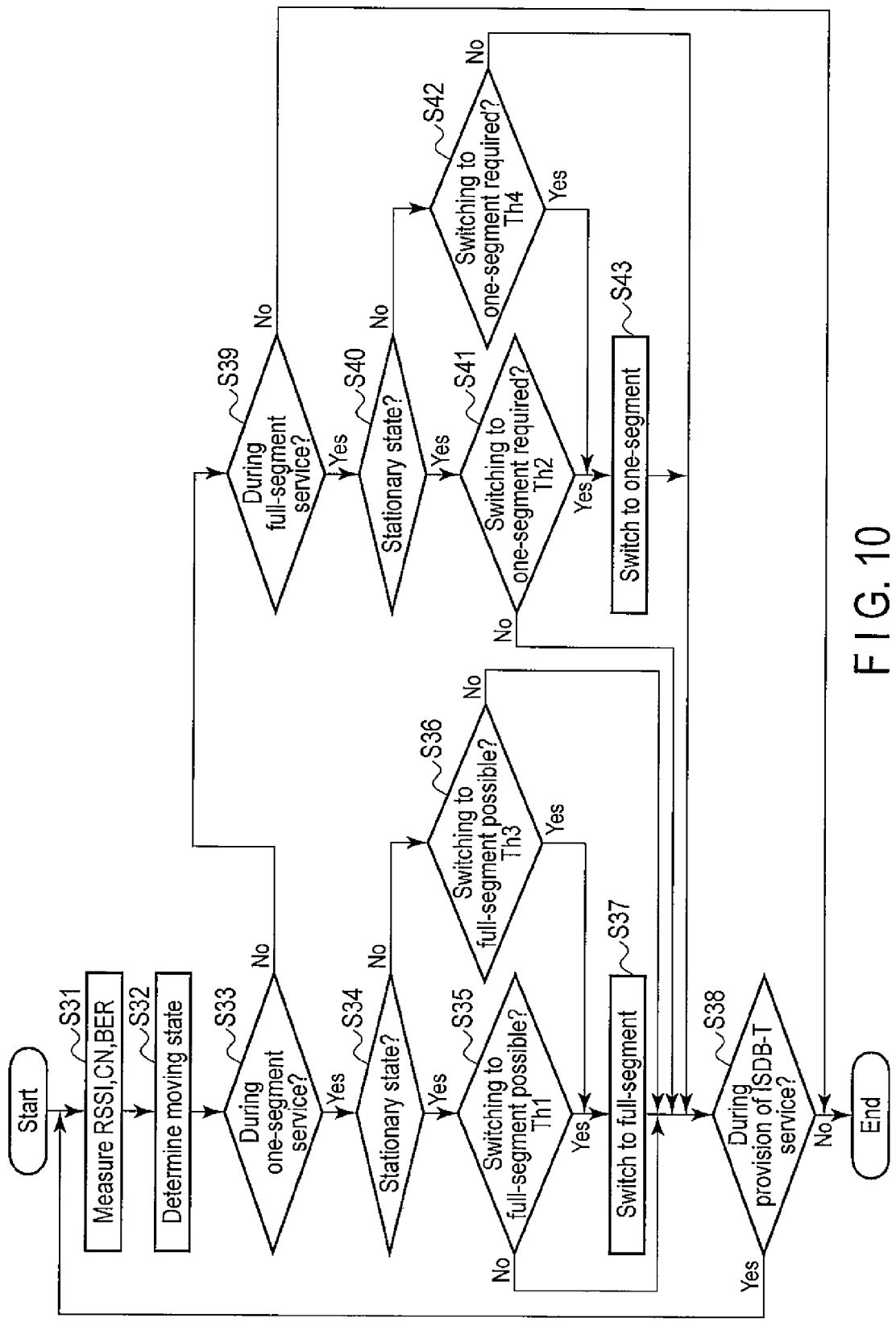
F I G. 10

ELECTRONIC DEVICE AND RECEPTION CONTROL METHOD

CROSS-REFERENCE TO RELATED APPLICATIONS

This application is based upon and claims the benefit of priority from prior Japanese Patent Application No. 2012-047953, filed Mar. 5, 2012; the entire contents of which are incorporated herein by reference.

FIELD

Embodiments described herein relate generally to an electronic device configured to receive a broadcast signal and a reception control method applied to the electronic device.

BACKGROUND

In recent years, a broadcast service including both a high-speed transmission channel and a low-speed transmission channel, the channels having different combinations of error resistance and transmissible video signal quality, has been implemented. A broadcast of the high-speed transmission channel is a broadcast service for a fixed TV, and a broadcast of the low-speed transmission channel is a broadcast service for a mobile TV. In an ISDB-T system adopted in Japan, a full-segment broadcast corresponds to the broadcast service of the high-speed transmission channel and a one-segment broadcast corresponds to the broadcast service of the low-speed transmission channel.

Recently, there has been developed a receiver having a function of automatically switching a demodulation target service between a full-segment broadcast and a one-segment broadcast. It is general to switch the full-segment broadcast and the one-segment broadcast based on a received signal quality value such as a bit-error rate (BER) or the carrier-to-noise power ratio (CN). For example, when the received signal quality value such as the CN exceeds a given reference value associated with the full-segment broadcast, a demodulation target broadcast signal is switched to a full-segment broadcast service.

However, since the full-segment broadcast has the low error resistance, when the switching is performed using the same reference value irrespective of a difference in environment such as a moving state/stationary state of the receiver, inconvenience, for example, repetition of switching between the full-segment broadcast and the one-segment broadcast may possibly occur.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram illustrating a system configuration of the electronic device according to the embodiment;

FIG. 4 is an exemplary view for explaining a relationship between a necessary CN, receiving sensitivity, and reception power in the electronic device according to the embodiment;

FIG. 5 is an exemplary view illustrating an example of changes in the measured CN when the environment of the electronic device according to the embodiment is changed from a moving state to a stationary state and from the stationary state to the moving state;

FIG. 6 is an exemplary flowchart for explaining a procedure of one-segment broadcast/full-segment broadcast switching processing when the same reference value is used for both the moving state and the stationary state;

FIG. 10 is an exemplary flowchart for explaining a procedure of one-segment broadcast/full-segment broadcast switching processing executed by the electronic device according to this embodiment.

DETAILED DESCRIPTION

Various embodiments will be described hereinafter with reference to the accompanying drawings.

In general, according to one embodiment, an electronic device includes a receiver, a first measuring module, a second measuring module, and a control module.

The receiver is configured to receive a broadcast signal comprising a high-speed transmission channel and a low-speed transmission channel. The channels have different combinations of error resistance and transmissible video signal quality. The first measuring module is configured to measure a carrier-to-noise power ratio (CN) of the broadcast signal. The second measuring module is configured to measure a reception power of the broadcast signal.

The control module is configured to estimate a CN when the electronic device is assumed to be present in an environment corresponding to a stationary state, based on the measured reception power, reception sensitivity required for receiving a broadcast service of the high-speed transmission channel and a necessary CN required for receiving the broadcast service of the high-speed transmission channel, and to control a processing of switching a demodulation target broadcast service between the high-speed transmission channel and the low-speed transmission channel, based on a difference between the estimated CN and the measured CN.

Figure 1:
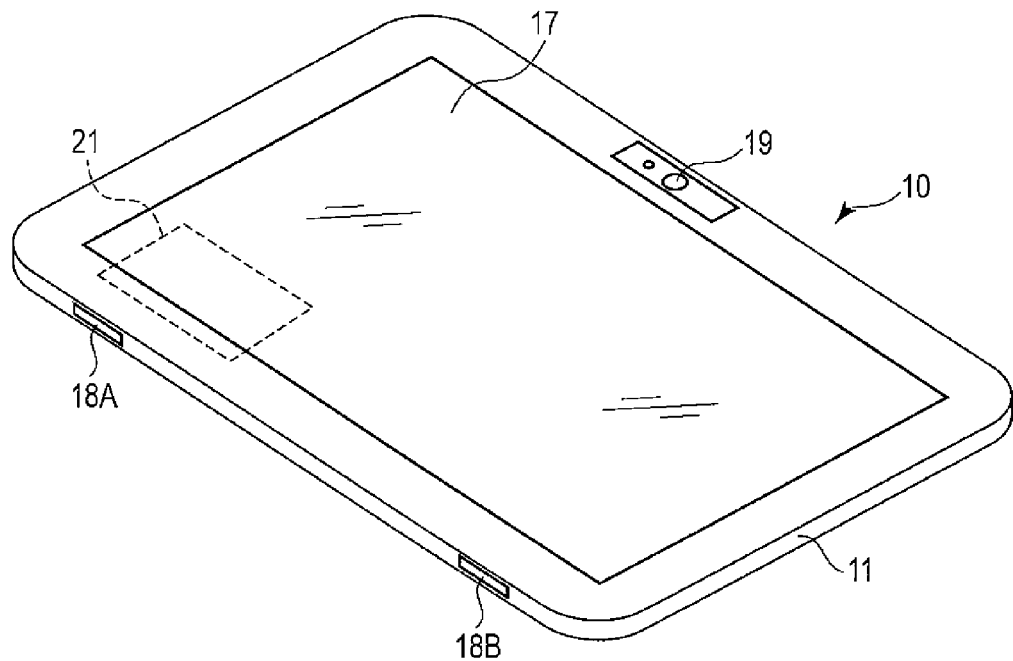
FIG. 1 is an exemplary perspective view illustrating an appearance of an electronic device according to an embodiment.

FIG. 1 is a perspective view showing an appearance of an electronic device according to an embodiment. This electronic device is a portable electronic device that can receive broadcast signals including broadcast services of both a high-speed transmission channel and a low-speed transmission channel which have different combinations of error resistance and transmissible video signal quality, and it can be realized as, for example, a tablet terminal, a smartphone, a PDA, or a portable TV. In the following description, it is assumed that this electronic device is realized as a tablet terminal (a tablet personal computer) 10. As shown in FIG. 1, the tablet terminal 10 is constituted of a main body 11 and a touchscreen display 17.

The main body 11 has a thin box-like housing. In the touchscreen display 17 are incorporated a flat panel display like a liquid crystal display (LCD) and a touchpanel. The touchpanel is provided to cover a screen of the flat panel display. The touchscreen display 17 is disposed to overlap an upper surface of the main body 11. This touchscreen display 17 can detect a position on a display screen touched by an external object (a pen or a finger of a hand).

A camera 19 is arranged on an upper surface of the main body 11. Furthermore, two speakers 18A and 188 are arranged on a side surface extending in the longitudinal direction of the main body 11. Moreover, a receiving unit 21 is provided in the main body 11. The receiving unit 21 is a receiver configured to receive the broadcast signals. The receiving unit 21 is realized as, for example, a TV tuner associated with an ISDB-T system. In the ISDB-T system, a full-segment broadcast which is a broadcast service for a fixed TV corresponds to the high-speed transmission channel, and a one-segment broadcast which is a broadcast service for a mobile TV corresponds to the low-speed transmission channel.

In this tablet terminal 10, the touchscreen display 17 is used as a main display configured to display screens of various kinds of application programs. At the time of receiving a TV broadcast signal, a video picture corresponding to on-air program data of the received TV broadcast signal is displayed in the touchscreen display 17. This tablet terminal 10 is used in different environments such as a moving state and a stationary state. The moving state is an environment which is apt to be affected by fading and others and, for example, a state of moving at a given speed corresponds to the moving state.

Figure 2:
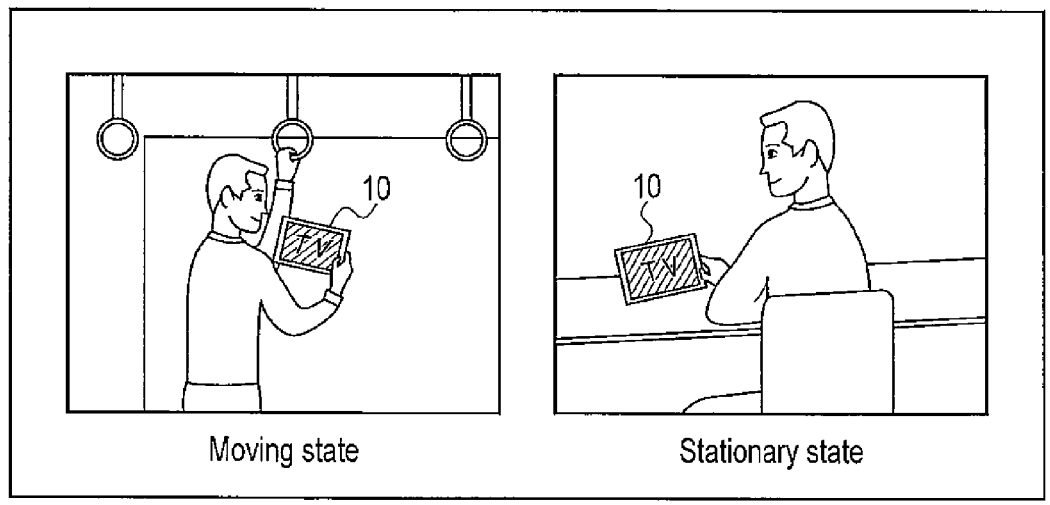
FIG. 2 is an exemplary view for explaining a usage scene of the electronic device according to the embodiment.

FIG. 2 shows an example of a usage scene of this tablet terminal 10. The left side of FIG. 2 shows an example that this tablet terminal 10 is in the moving state, and it depicts a state that a user is using this tablet terminal 10 in a train and watching on-air program data. The right side of FIG. 2 shows an example that this table terminal 10 is in the stationary state, and it depicts a state that a user is using this table terminal 10 in house and the like and watching the on-air program data. It is to be noted that, when a moving speed is relatively low, for example, in an environment that the user is walking while holding this tablet terminal 10, influence of noise such as fading may be small. Such a state corresponds to the stationary state.

FIG. 3 is a view showing a system configuration of this tablet terminal 10.

As shown in FIG. 3, this tablet terminal 10 includes a CPU 101, a north bridge 102, a main memory 103, a south bridge 104, a graphics controller 105, a sound controller 106, a BIOS-ROM 107, an LAN controller 108, a nonvolatile memory 109, a vibrator 110, an accelerator sensor 111, a wireless LAN controller 112, an embedded controller (EC) 113, an EEPROM 114, an HDMI control circuit 3, and others.

The CPU 101 is a processor that controls operations of respective units in the tablet terminal 10. The CPU 101 executes an operating system (OS) 201 and various kinds of application programs which are loaded from the nonvolatile memory 109 to the main memory 103. The application programs include a TV application program 202A. This TV application program 202A executes processing or the like that reproduces program data included in a TV broadcast signal received by the receiving unit 21. A tuner driver 202B is a driver program for controlling the receiving unit 21, and it executes processing or the like that switches a broadcast service, which should be demodulated by the receiving unit 21, between full-segment for the fixed TV and one-segment for the mobile TV.

Additionally, the CPU 101 also executes a BIOS stored in the BIOS-ROM 107. The BIOS is a program for controlling hardware.

The north bridge 102 is a bridge device that connects a local bus of the CPU 101 with the south bridge 104. The north bridge 102 has a built-in memory controller that controls access of the main memory 103. Further, the north bridge 102 also has a function of executing communication with the graphics controller 105 through, for example, a serial bus based on a PCI EXPRESS standard.

The graphics controller 105 is a display controller that controls an LCD 17A that is used as a display monitor of this tablet terminal 10. A display signal generated by this graphics controller 105 is supplied to the LCD 17A. The LCD 17A displays a video picture based on the display signal. A touchpanel 17B is arranged on this LCD 17A. The touchpanel 17B is a pointing device which is used to perform input on a screen of the LCD 17A. A user can use the touchpanel 17B and operate a graphical user interface (GUI) and others displayed in the screen of the LCD 17A. For example, when the user touches a button displayed in the screen, he/she can instruct to execute a function associated with this button.

An HDMI terminal 2 is an external display connection terminal. The HDMI terminal can supply a non-compressed digital video signal and a digital audio signal to an external display device 1 through one cable. An HDMI control circuit 3 is an interface configured to supply a digital video signal to an external display device 1 which is called an HDMI monitor through the HDMI terminal 2.

The south bridge 104 controls respective devices on a peripheral component interconnect (PCI) bus and respective devices on a low pin count (LPC) bus. Further, the south bridge 104 has a built-in ATA controller configured to control the nonvolatile memory 109.

The south bridge 104 has a built-in USB controller configured to control various kinds of USB devices. Furthermore, the south bridge 104 also has a function of executing communication with the sound controller 106. The sound controller 106 is a sound source device and outputs audio data as a reproduction target to the speakers 18A and 183. The LAN controller 108 is, for example, a wire communication device that executes wire communication conformant to the IEEE 802.3 standard. The wireless LAN controller 112 is, for example, a wireless communication device that executes wireless communication conformant to the IEEE 802.11 standard.

The EC 113 is a single-chip microcomputer including an embedded controller for power management. The EC 113 has a function of turning on/off this tablet terminal 10 in accordance with an operation of a power button performed by a user.

The receiving unit 21 is a TV tuner associated with the ISDB-T system, and it is configured to receive broadcast signals including both broadcast services of full-segment as a high-speed transmission channel and one-segment as a low-speed transmission channel. This receiving unit 21 includes an RF tuner unit 211, a reception power detection unit 212, a CN measurement unit 213, an OFDM demodulation unit 214, a TS demultiplexer 215, an interface unit 216, and others. The RF tuner unit 211 receives a broadcast signal associated with a reception target channel selected from channels and converts the received broadcast signal into an intermediate frequency signal. The broadcast signal of each channel is divided into 13 segments, one segment at the center of the 13 segments is used for the broadcast service of the one-segment, and the 12 segments are used for the broadcast service of full-segment.

The reception power detection unit 212 measures a reception power of the broadcast signal. The CN measurement unit 213 measures the carrier-to-noise power ratio (CN). Here, the carrier power is power corresponding to the reception power. The OFDM demodulation unit 214 demodulates a signal associated with the broadcast service as a demodulation target included in the received broadcast signal (full-segment or one-segment) and extracts a transport stream packet (TS packet) group associated with full-segment or one-segment from the received broadcast signal. The TS demultiplexer 215 extracts a TS packet group of program data associated with a full-segment broadcast or a one-segment broadcast from the TS packet group. The packet group extracted by the TS demultiplexer 215 is supplied to a TV application program 202A through the interface unit 216.

It is to be noted that the receiving unit 21 may include a function of measuring not only the CN but also any other index indicative of signal quality such as a BER or received signal intensity (RSSI).

A relationship between a necessary CN, reception sensitivity, and reception power will now be described with reference to FIG. 4. The necessary ON which is required to receive (demodulate) a full-segment broadcast as the broadcast service of the high-speed transmission channel means a ON value required for receiving the full-segment broadcast, i.e., a margin of reception power with respect to a noise level (noise power). The necessary CN of the full-segment broadcast is, for example, 21 dB. The reception sensitivity for receiving (demodulating) the full-segment broadcast is power obtained by adding the necessary CN of the full-segment broadcast to the noise level (the noise power). For example, if the noise level (the noise power) is −100 dBm and the necessary CN of the full-segment broadcast is 21 dB, the reception sensitivity for receiving the full-segment broadcast is −79 dBm. When the reception power is greater than −79 dBm as the reception sensitivity, the full-segment broadcast can be received (demodulated). On the other hand, when the reception power is smaller than −79 dBm as the reception sensitivity, the full-segment broadcast cannot be normally received (demodulated).

For example, if the reception power of the broadcast signal during a given period T1 is reception power A (=−60 dBm), since the reception power A is greater than the reception sensitivity, the full-segment broadcast can be received. On the other hand, if the reception power of the broadcast signal during the period T1 is reception power B (=−80 dBm), since the reception power B is smaller than the reception sensitivity, the full-segment broadcast cannot be received.

Usually, a receiver of a wireless system has a function of measuring the necessary CN or a BER as a signal quality index required for demodulation. Here, in the high-speed transmission channel (full-segment broadcast) and the low-speed transmission channel (one-segment broadcast), a modulation system and an error correction encoding ratio are different from each other, whereby a combination of low resistance against error and high frequency usage efficiency is used for the high-speed transmission channel and a combination of high resistance against error and low frequency usage efficiency is used for the low-speed transmission channel. In the broadcast service of the low-speed transmission channel, for example, QPSK is used as the modulation system, and the error correction encoding ratio is, for example, 2/3. In the broadcast service of the high-speed transmission channel, for example, 64 QAM is used as the modulation system, and the error correction encoding ratio is, for example, 3/4.

Therefore, since the high-speed transmission channel requires higher signal quality than the low-speed transmission channel, the necessary CN associated with the high-speed transmission channel is generally higher than the necessary CN associated with the low-speed transmission channel. Here, if the tablet terminal 10 is in the stationary state and electromagnetic radiation acting as noise for the receiver are not radiated in a frequency band of the ISDB-T system and adjacent bands thereof, the necessary CN defined with respect to each of the high-speed transmission channel and the low-speed transmission channel has a value fixed with respect to each channel. However, a greater CN than that necessary in the stationary state may be required because of deterioration in signal quality due to fading caused by movement in some cases, for example. This is the influence of phase rotation/amplitude fluctuation of a transmitting signal due to fading, and it is general to use a reference signal for correcting the phase rotation/amplitude fluctuation of the transmitting signal (to be referred to as a pilot signal hereinafter), estimate the transmission path, and correct the signal. For example, in the mobile communication system defined by, for example, 3GPP, the pilot signal having density that can guarantee a target moving speed is inserted into the transmitting signal. Here, as to the ISDB-T system, resistance is guaranteed to some extent with respect to one-segment on the premise of movement, but a fixed receiver is a target of design in regard to full-segment, and hence resistance is very low. Therefore, as to full-segment, the necessary CN may possible differ depending on the stationary state and the moving state. The necessary CN=21 dB corresponds to the necessary CN for receiving (demodulating) full-segment in the stationary state (the necessary CN in the stationary state). Likewise, the reception sensitivity=−79 dBm corresponds to the reception sensitivity of the full-segment associated with the stationary state (the reception sensitivity in the stationary state).

FIG. 5 shows a measured CN when a train is taken as an example and a state is changed in the order of the moving state, the stationary state, and the moving state. The measured ON is indicative of a ON value which is measured by the CN measurement unit 213, i.e., a CN value which is deteriorated because of the fading in the moving state. Even if reception power intensity is high to some extent, the measured CN is deteriorated by the fading in the moving state, and reception (demodulation) may possibly become difficult.

A flowchart of FIG. 6 shows a procedure of one-segment broadcast/full-segment broadcast switching processing when the same reference value is used in the moving state and the stationary state. Usually, a threshold value used for switching full-segment to one-segment is different from a threshold value used for switching one-segment to full-segment, and hysteresis characteristics are generally provided.

That is, first, received signal intensity (RSSI), a ON, a BER, and others are measured (step S11). During the one-segment service, i.e., during reception/demodulation of the one-segment broadcast (YES in step S12), whether the measured CN is greater than or equal to a threshold value Th1 for switching to full-segment is determined (step S13). If the measured CN is greater than or equal to threshold value Th1

(YES in step S13), the broadcast service as a demodulation target is switched to full-segment (step S14).

Figure 7:
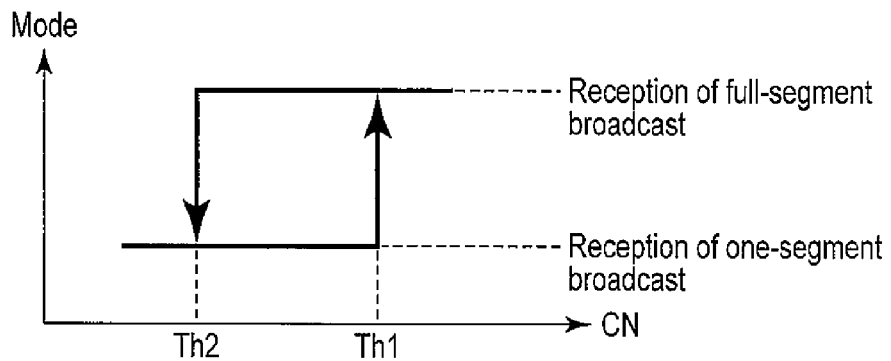
FIG. 7 is an exemplary view for explaining a threshold value for switching from the one-segment broadcast to the full-segment broadcast and a threshold value for switching from the full-segment broadcast to the one-segment broadcast which are used in the one-segment broadcast/full-segment broadcast switching processing depicted in FIG. 6.

On the other hand, during the full-segment service, i.e., during the reception/demodulation of the full-segment broadcast (YES in step S16), whether the measured CN is not greater than a threshold value Th2 which is used for switching to one-segment (step S17). As shown in FIG. 7, threshold value Th2 is set to a value lower than threshold value Th1. Threshold value Th2 is set to such a value to provide hysteresis characteristics. When the measured CN becomes less than or equal to threshold value Th2 for switching to one-segment (YES in step S17), the broadcast service as a demodulation target is switched to one-segment (step S18).

During a period in which the ISDB-T service is used, i.e., during a period in which the broadcast signal is received, the processing of steps S11 to S14 and steps S16 to S18 is repeatedly executed (step S15).

Although FIG. 6 shows an example where the CN is simply used as an index of the signal quality level of the broadcast signal, the BER may be used in place of the CN, or a value obtained by averaging the CN and the BER may be used as a received signal quality level. Further, it is possible to add timer processing for adding to the switching conditions a state that a time during which the CN, the BER, or the value obtained by averaging the CN and the BER is not lower than Th1 has reached a threshold time and a state that a time during which the CN, the BER, or the value obtained by averaging the ON and the BER is not greater than Th2 has reached a threshold value.

In case of FIG. 6, since threshold values specialized for the moving state and the stationary state are not provided, for example, in the moving state shown in FIG. 5, at a point where reception power is large by chance (time t1 in FIG. 5), one-segment is switched to full-segment. Furthermore, switching from full-segment to one-segment immediately occurs.

In this embodiment, to take a difference in environment like the moving state/stationary state into consideration and adaptively enable execution of switching between one-segment and full-segment, the CN when the tablet terminal 10 is assumed to be in an environment corresponding to the stationary state is estimated, based on the reception power, the reception sensitivity for receiving full-segment, and the necessary CN which is used for receiving full-segment. In such an environment as the stationary state, the estimated CN (a converted CN) is substantially equal to the measured CN. Therefore, based on a difference between the converted CN and the measured CN, the moving state/stationary state can be determined. Therefore, when the processing of switching the broadcast service as a demodulation target between the low-speed transmission channel (one-segment) and the high-speed transmission channel (full-segment) is controlled based on a difference between the estimated CN (the converted CN) and the measured CN, a difference in environment like the moving state/stationary state can be taken into consideration, and the switching between the high-speed transmission channel and the low-speed transmission channel can be adaptively executed.

That is, in this embodiment, based on the following expression, the converted CN (the ON when the tablet terminal 10 is assumed to be in an environment corresponding to the stationary state) is calculated, and a difference between the measured CN and the converted CN is evaluated, whereby it is possible to determine which one of the moving state where the CN is deteriorated and the stationary state where the CN is hardly deteriorated the current environment corresponds to.

The converted CN=reception power−reception sensitivity+necessary CN

Based on the above expression, it is possible to obtain as the converted CN an estimated value of the CN when the tablet terminal 10 is in the stationary state and electromagnetic radiation acting as noise for the receiver are not radiated in a frequency band of the ISDB-T system and adjacent bands thereof.

For example, on the assumption of provision of an environment corresponding to the stationary state where a noise level hardly changes, if the reception power is substantially equal to the reception sensitivity required for receiving full-segment, it can be considered that the CN to be measured is substantially equal to the necessary ON (for example, 21 dB) required for receiving full-segment. If the reception power is higher than the reception sensitivity, it can be considered that the CN to be measured is larger than the necessary CN for receiving full-segment by a difference between the reception power and the reception sensitivity. Therefore, like the above expression, adding the difference between the reception power and the reception sensitivity to the necessary CN enables obtaining an estimated value of the CN when electromagnetic radiation acting as noise for the receiver are not radiated and the stationary state is assumed to be provided.

In the example of FIG. 4, if the reception power is the reception power A (=−60 dBm), this reception power A is 19 dB higher than the reception sensitivity −79 dBm. In this case, if it is assumed that the electromagnetic radiation acting as noise for the receiver are not radiated and the stationary state is provided, the CN to be measured is also estimated to be 19 dB higher than the necessary CN. In the above expression, the converted CN=−60−(−79)+21=40 dB is obtained. If the current environment is the stationary state, the actually measured CN substantially coincides with the converted CN (=40 dB). On the other hand, if the current environment is the moving state, the measured CN is deteriorated, and hence the measured CN is a value which is lower than the converted CN (=40 dB) to some extent.

If the reception power is the reception power B (=−80 dBm), this reception power B is 1 dB lower than the reception sensitivity −79 dBm. In this case, if it is assumed that the electromagnetic radiation acting as noise for the receiver are not radiated and the stationary state is provided, the CN to be measured is also estimated to be 1 dB lower than the necessary CN. In the above expression, the converted CN=−80−(−79)+21=20 dB is obtained. If the current environment is the stationary state, the actually measured CN substantially coincides with the converted CN (=20 dB). On the other hand, if the current environment is the moving state, the measured CN is deteriorated, and hence the measured CN is a value which is lower than the converted CN (=20 dB) to some extent.

Figure 8:
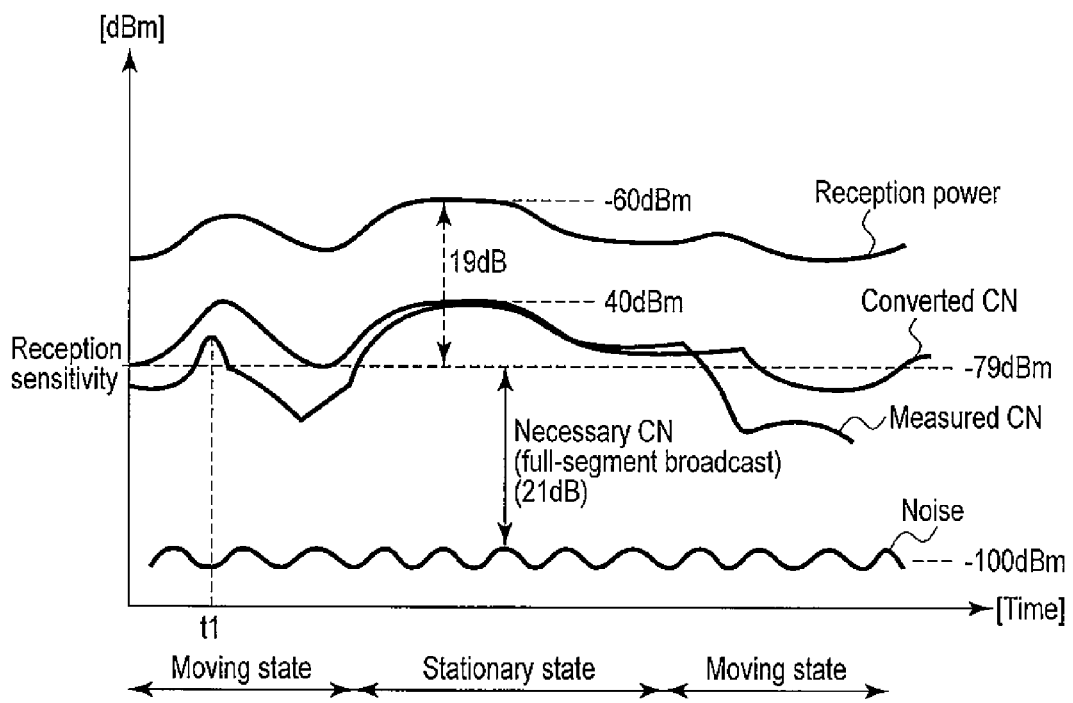
FIG. 8 is an exemplary view illustrating a relationship between a converted CN and a measured CN when the environment of the electronic device according to this embodiment changes from the moving state to the stationary state and from the stationary state to the moving state.

FIG. 8 shows a relationship between the converted CN and the measured CN when the environment of the tablet terminal 10 is changed from the moving state to the stationary state and from the stationary state to the moving state. As described above, when the reception power is −60 dBm and it is 19 dB higher than the reception sensitivity −79 dBm, a value of 40 dB (=19+21 dB) is obtained as the converted CN.

As can be understood from FIG. 8, in the stationary state, the converted CN is substantially equal to a value of the measured CN. There is a slight difference between the converted CN and the measured CN because a fluctuation in noise level and others actually occur even in the stationary state. When the CN is deteriorated by fading due to movement, a difference appears between the converted CN and the measured CN. Therefore, by determining whether the difference between the converted CN and the measured CN is equal to or larger than a threshold, it is possible to determine which one of an environment corresponding to the moving state and an environment corresponding to the stationary state the current environment is without adding special hardware, thereby executing the switching processing adapted to the current environment.

Figure 9:
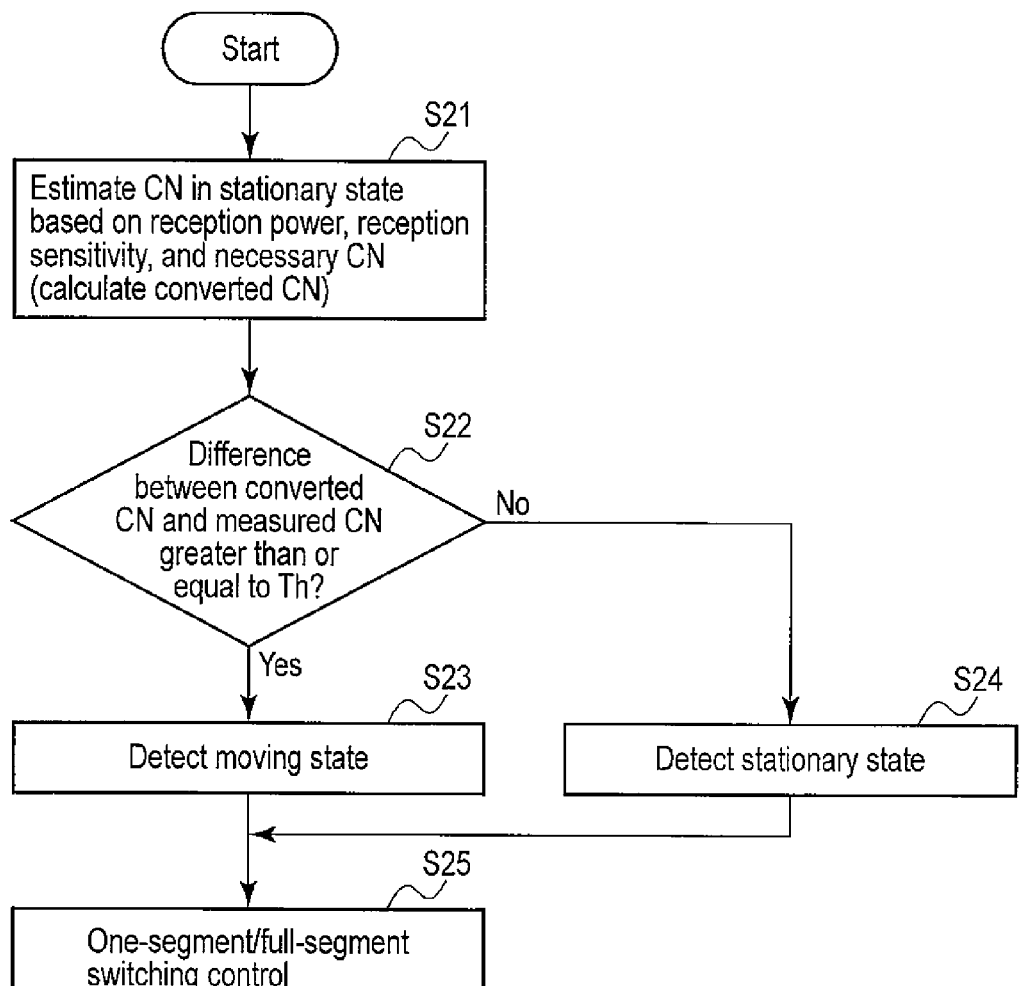
FIG. 9 is an exemplary flowchart for explaining a procedure of communication environment (stationary state/moving state) determination processing executed by the electronic device according to this embodiment.

A procedure of communication environment (stationary state/moving state) determination processing according to this embodiment will now be described with reference to a flowchart of FIG. 9. This determination processing can be executed by a tuner driver 202B.

The tuner driver 202B acquires current reception power from the receiving unit 21 and executes processing of estimating a value of the current CN (converted CN) when the tablet terminal 10 is assumed to be in an environment corresponding to the stationary state, based on the reception power, the reception sensitivity required for receiving full-segment, and the necessary CN required for receiving full-segment (step S21). The tuner driver 202B acquires the current measured CN from the receiving unit 21 and determines whether the tablet terminal 10 is in an environment corresponding to the moving state, based on a difference between the converted CN and the measured CN. Specifically, the tuner driver 2023 determines whether the difference between the converted CN and the measured CN is not lower than the threshold value Th (step S22).

If the difference between the converted CN and the measured CN is not lower than the threshold value Th (YES in step S22), the tuner driver 202B detects that the table terminal 10 is in the environment corresponding to the moving state (step S23). On the other hand, if the difference between the converted CN and the measured CN is smaller than the threshold value Th (NO in step S22), the tuner driver 202B detects that the tablet terminal 10 is in the environment corresponding to the stationary state (step S24). Further, the tuner driver 202B controls the processing of switching the broadcast service as a demodulation target between the one-segment broadcast and the full-segment broadcast in accordance with a result of detecting the stationary state/moving state, i.e., in accordance with the difference between the converted CN and the measured CN (step S25).

In step S25, the tuner driver 202B may control the switching between the one-segment broadcast and the full-segment broadcast so that the one-segment broadcast can be used in priority to the full-segment broadcast, when the tablet terminal 10 is in the environment corresponding to the moving state, namely, when the difference between the converted CN and the measured CN is large.

In this case, the tuner driver 202B may determine the one-segment broadcast as the broadcast service which is the demodulation target in case of the moving state, i.e., when the difference between the converted CN and the measured CN is large, and it may determine the full-segment broadcast as the broadcast service which is the demodulation target in case of the stationary state, i.e., when the difference between the converted CN and the measured ON is small.

Furthermore, the threshold value that is used for switching the broadcast service as the demodulation target may be changed between the moving state and the stationary state. In this case, in steps S25, the tuner driver 202B executes processing of switching the broadcast service as the demodulation target between the one-segment broadcast and the full-segment broadcast based on a result of comparing the received signal quality of the broadcast signal with the one or more threshold values. Moreover, the tuner driver 202B changes the threshold value that is used for switching the one-segment broadcast and the full-segment broadcast in accordance with the difference between the converted CN and the measured ON, i.e., the moving state/stationary state. For example, the threshold value can be changed to a threshold value that makes the switching from full-segment to one-segment in the moving state easier than the switching from full-segment to one-segment in the stationary state, and the same can be changed to a threshold value that makes the switching from one-segment to full-segment may in the moving state harder than the switching in the stationary state.

Additionally, the one-segment broadcast may be determined as the broadcast service which is the demodulation target in case of the moving state, i.e., when the difference between the converted CN and the measured CN is large, and the broadcast service as the demodulation target may be switched between the one-segment broadcast and the full-segment broadcast based on signal quality like the measured ON in case of the stationary state, i.e., when the difference between the converted CN and the measured CN is small.

Further, the tuner driver 202B may determine which one of environments, for example, the stationary state, a low-speed moving speed, a medium-speed moving state, and a high-speed moving state that the tablet terminal 10 is present in rather than determine which one of the two environments, i.e., the stationary state and the moving state the same is present in, based on the difference between the converted CN and the measured CN, and change the threshold value for switching the one-segment broadcast and the full-segment broadcast among the stationary state, the low-speed moving state, the medium-speed moving state, and the high-speed moving state on multiple levels. In this case, the threshold value is changed on multiple levels in accordance with the difference between the measured ON and the converted CN.

A procedure of the processing of switching the one-segment broadcast/full-segment broadcast will now be described with reference to a flowchart of FIG. 10. Here, a case that the threshold value used for switching the one-segment broadcast and the full-segment broadcast is changed between the stationary state and the moving state will be exemplified and explained.

First, received signal intensity (RSSI), a CN, a BER, and others are measured in the receiving unit 21 (step S31). The tuner driver 202B acquires current reception power from the receiving unit 21, calculates the converted CN, and makes a determination on the moving state/stationary state based on a difference between this converted CN and the measured CN (step S32).

Figure 11:
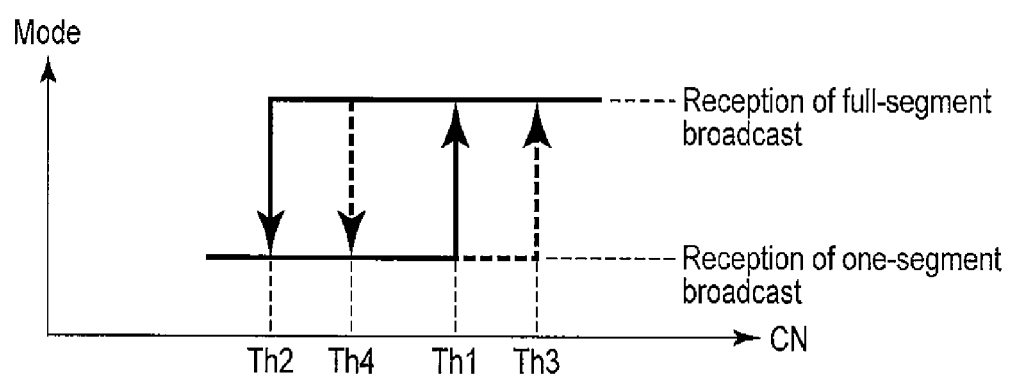
FIG. 11 is an exemplary view for explaining two threshold values for switching from the one-segment broadcast to the full-segment broadcast and two threshold values for switching from the full-segment broadcast to the one-segment broadcast which are used in the one-segment broadcast/full-segment broadcast switching processing in FIG. 10.

During the one-segment service, i.e., during reception/demodulation of the one-segment broadcast (YES in step S33), the tuner driver 202B changes the threshold value for switching to full-segment in accordance with the stationary state or the moving state. That is, the tuner driver 202B first determines whether the current state is the stationary state (step S34). If the current state is the stationary state (YES in step S34), the tuner driver 202B compares the measured CN with the threshold value Th1 for switching to full-segment and makes a determination on whether switching to full-segment is possible depending on whether the measured CN is not lower than threshold value Th1 (step S35). On the other hand, if the current state is, the moving state (NO in step S34), the tuner driver 202B compares the measured CN with a threshold value Th3 for switching to full-segment and makes a determination on whether switching to full-segment is possible depending on whether the measured CN is not lower than threshold value Th3 (step S35). As shown in FIG. 11, as threshold value Th3 for the moving state, a value higher than threshold value Th1 for the stationary state can be used.

If conditions for switching to full-segment are met, the tuner driver 202B controls the receiving unit 21 and switches the broadcast service as the demodulation target to full-segment (step S37).

On the other hand, during the full-segment service, i.e., during reception/demodulation of the full-segment broadcast (YES in step S39), the tuner driver 202B changes the threshold value for switching to one-segment in accordance with the stationary state or the moving state. That is, the tuner driver 202B first makes a determination on whether the current state is the stationary state (step S40). If the current state is the stationary state (YES in step S40), the tuner driver 202B compares the measured CN with a threshold value Th2 for switching to one-segment and makes a determination on whether switching to one-segment is required depending on whether the measured CN is not higher than threshold value Th2 (step S41). On the other hand, if the current state is the moving state (NO in step S40), the tuner driver 202B compares the measured CN with threshold value Th4 for switching to one-segment and makes a determination on whether switching to one-segment is required depending on whether the measured CN is not lower than threshold value Th4 (step S42). As shown in FIG. 11, as threshold value Th4 for the moving state, a value higher than threshold value Th2 for the stationary state can be used.

If conditions for switching to one-segment are met, the tuner driver 202B controls the receiving unit 21 and switches the broadcast service as the demodulation target to one-segment (step S43).

During a period in which the ISDB-T service is used, i.e., during a period in which the broadcast signal is received, the processing of steps S31 to S37 and steps S39 to S43 is repeatedly executed (step S38).

It is to be noted that the example of using the CN as the index of the received signal quality has been explained here, but the BER may be used as the received signal quality in place of the CN, or a value obtained by averaging the CN and the BER may be used as the received signal quality. Furthermore, such timer processing as described in conjunction with FIG. 6 may be added.

As explained above, according to this embodiment, the current ON when the tablet terminal 10 is assumed to be present in an environment corresponding to the stationary state is estimated based on the reception power, the reception sensitivity for receiving the high-speed transmission channel, and the necessary CN for receiving the high-speed transmission channel broadcast, and the processing of switching the broadcast service as the demodulation target between the high-speed transmission channel and the low-speed transmission channel is controlled based on a difference between the estimated CN (the converted CN) and the measured CN. Therefore, a difference in environment like the moving state/stationary state can be taken into consideration, and the high-speed transmission channel and the low-speed transmission channel can be switched.

Moreover, when the threshold value for switching the high-speed transmission channel and the low-speed transmission channel is changed based on the difference between the converted CN and the measured CN, this threshold value for switching can be set to a value associated with the current environment of the table terminal 10.

For example, the threshold value is changed to a threshold value that makes the switching from full-segment to one-segment in the moving state where the difference between the converted CN and the measured CN is large easier than that in the stationary state where the difference between the converted CN and the measured CN is small, and the same is changed to a threshold value that makes the switching from one-segment to full-segment in the moving state harder than that in the stationary state, whereby the switching between one-segment and full-segment can be prevented from frequently occurring in the moving state.

It is to be noted that the situation where the switching control between one-segment and full-segment is executed by the tuner driver is exemplified in this embodiment, but a controller configured to execute the switching control between one-segment and full-segment may be provided in the receiving unit 21.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a receiving unit configured to receive a broadcast signal comprising a high-speed transmission channel and a low-speed transmission channel, the high-speed transmission channel comprising different combinations of error resistance and transmissible video signal quality than the low-speed transmission channel;
    a first measuring module configured to measure a carrier-to-noise power ratio (CN) of the broadcast signal;
    a second measuring module configured to measure a reception power of the broadcast signal; and
    a control module configured to:
        estimate the CN when the electronic device is in an environment corresponding to a stationary state, based on the measured reception power, a reception sensitivity for receiving a broadcast service of the high-speed transmission channel, and a first CN for receiving the broadcast service of the high-speed transmission channel, and
        switch a demodulation target broadcast service between the high-speed transmission channel and the low-speed transmission channel based on a difference between the estimated CN and the measured CN.

2. The device of claim 1,
    wherein the control module is further configured to determine whether the electronic device is in an environment corresponding to a moving state based on the difference between the estimated CN and the measured CN, and to control a switch of the demodulation target broadcast service so that the low-speed transmission channel is used in priority to the high-speed transmission channel when the electronic device is in the environment corresponding to the moving state.

3. The device of claim 1,
    wherein the control module is further configured to switch the demodulation target broadcast service between the high-speed transmission channel and the low-speed transmission channel based on a result of a comparison between a received signal quality of the broadcast signal and a threshold value, and to change the threshold value based on the difference between the estimated CN and the measured CN.

4. The device of claim 3,
wherein the control module is further configured to determine whether the electronic device is in the environment corresponding to the stationary state or a moving state based on the difference between the estimated CN and the measured CN,
the threshold value includes a first threshold value for switching from the low-speed transmission channel to the high-speed transmission channel,
the first threshold value is set to a first value when the electronic device is in the environment corresponding to the stationary state, and
the first threshold value is set to a second value higher than the first value when the electronic device is in the environment corresponding to the moving state.

5. The device of claim 3,
wherein the control module is further configured to determine whether the electronic device is in the environment corresponding to the stationary state or a moving state based on the difference between the estimated CN and the measured CN,
the threshold value includes a second threshold value for switching from the high-speed transmission channel to the low-speed transmission channel,
the second threshold value is set to a first value when the electronic device is in the environment corresponding to the stationary state, and
the second threshold value is set to a second value higher than the first value when the electronic device is in the environment corresponding to the moving state.

6. A reception control method for an electronic device, the method comprising:
measuring a carrier-to-noise power ratio (CN) of a broadcast signal;
measuring a reception power of the broadcast signal;
estimating the CN when the electronic device is in an environment corresponding to a stationary state based on the measured reception power, a reception sensitivity for receiving a broadcast service of a high-speed transmission channel, and a first CN for receiving the broadcast service of the high-speed transmission channel; and
controlling switching of a demodulation target broadcast service between the high-speed transmission channel and a low-speed transmission channel based on a difference between the estimated CN and the measured CN.

7. The method of claim 6,
wherein the controlling comprises:
determining whether the electronic device is present in an environment corresponding to a moving state based on the difference between the estimated CN and the measured CN, and
controlling switching of the demodulation target broadcast service so that the low-speed transmission channel is used in priority to the high-speed transmission channel when the electronic device is in the environment corresponding to the moving state.

8. The method of claim 6,
wherein the controlling comprises:
switching the demodulation target broadcast service between the high-speed transmission channel and the low-speed transmission channel based on a result of a comparison between a received signal quality of the broadcast signal and a threshold value, and
changing the threshold value based on the difference between the estimated CN and the measured CN.

9. The method of claim 8,
wherein the controlling comprises determining whether the electronic device is in the environment corresponding to the stationary state or a moving state based on the difference between the estimated CN and the measured CN,
the threshold value includes a first threshold value for switching from the low-speed transmission channel to the high-speed transmission channel,
the first threshold value is set to a first value when the electronic device is in the environment corresponding to the stationary state, and
the first threshold value is set to a second value higher than the first value when the electronic device is in the environment corresponding to the moving state.

10. The method of claim 8,
wherein the controlling comprises determining whether the electronic device is in the environment corresponding to the stationary state or a moving state based on the difference between the estimated CN and the measured CN,
the threshold value includes a second threshold value for switching from the high-speed transmission channel to the low-speed transmission channel,
the second threshold value is set to a first value when the electronic device is in the environment corresponding to the stationary state, and
the second threshold value is set to a second value higher than the first value when the electronic device is in the environment corresponding to the moving state.

* * * * *